United States Patent
Moore

(10) Patent No.: US 6,471,137 B1
(45) Date of Patent: Oct. 29, 2002

(54) EXTERNALLY ACCESSIBLE CLIMATE CONTROL SYSTEM FOR PASSENGER COACHES

(75) Inventor: Christopher Allan Moore, Thomasville, NC (US)

(73) Assignee: Thomas Built Buses, Inc., High Point, NC (US)

( * ) Notice: Subject to any disclaimer, the term of this patent is extended or adjusted under 35 U.S.C. 154(b) by 0 days.

(21) Appl. No.: 09/547,830

(22) Filed: Apr. 12, 2000

(51) Int. Cl.$^7$ .............................. B60H 1/02
(52) U.S. Cl. .................... 237/12.3 B; 165/41
(58) Field of Search ............... 237/12.3 B, 12.3 C, 237/12.3 R; 165/41, 42

(56) References Cited

U.S. PATENT DOCUMENTS

| | | | |
|---|---|---|---|
| 2,158,758 A | 5/1939 | Lintern | |
| 2,655,092 A | 10/1953 | Spooner | 98/2 |
| 2,732,133 A | 1/1956 | Lintern | 237/12.3 |
| 3,986,492 A | 10/1976 | White | 126/350 |
| 4,319,519 A * | 3/1982 | Parsson | 454/110 |
| 4,787,210 A | 11/1988 | Brown | 62/89 |
| 4,893,845 A | 1/1990 | Bartholomew | 285/137.1 |
| 4,913,189 A * | 4/1990 | Kline | 137/560 |
| 5,673,964 A | 10/1997 | Roan et al. | 296/208 |
| 5,788,320 A * | 8/1998 | Hanemaayer | 296/164 |
| 5,863,093 A | 1/1999 | Novoa et al. | 296/190.01 |
| 5,946,929 A | 9/1999 | Selina et al. | 62/263 |

* cited by examiner

Primary Examiner—Harold Joyce
Assistant Examiner—Derek S. Boles
(74) Attorney, Agent, or Firm—MacCord Mason PLLC

(57) ABSTRACT

A climate control system for a school bus, includes a frame having a cavity therein, a climate control unit secured within the cavity, and a removable cover plate. The frame extends through an exterior wall and into the passenger compartment of the vehicle. Removal of the cover plate permits access to the components of the climate control unit for service or replacement. In the preferred embodiment, the frame includes a casing having a top wall, a floor and three side walls, and the climate control unit is a heater having a filter, heat exchanger, and blower fan. Liquid coolant, warmed by the internal combustion engine of the bus, is circulated from the engine to the heat exchanger.

33 Claims, 3 Drawing Sheets

EXTERNALLY ACCESSIBLE CLIMATE CONTROL SYSTEM FOR PASSENGER COACHES

BACKGROUND OF THE INVENTION

The present invention is related to climate control systems for coach vehicles. More particularly, the present invention relates to climate control systems for school buses and buses used in local transit applications. Even more particularly, the invention relates to heating systems within such buses.

Buses, particularly school and transit buses, comprise a class of motor vehicle having unique requirements. Liability issues arise because they transport a large number of passengers. The economics of construction, maintenance, and operation of large fleets—frequently by government agencies, such as school districts or transit authorities—is also a relevant factor.

More often than not, the budgets of state and local education departments are stretched to the limit; available assets, such as building space and school buses, must be used to their maximum potential. State and local school districts cannot afford to maintain a surplus of vehicles in their transportation fleets in order to cover for vehicles that are out of commission for any appreciable length of time. Vehicle down time should ideally be minimized so that a school bus can be repaired between its morning pickup and afternoon drop-off runs.

In particular, the climate control systems that heat and cool the passenger compartments of such vehicles are especially vexing. Such systems are subject to breakdown, due to the manner in which school buses and local transit coaches are used. Because such vehicles stop frequently to take on passengers, their heating or cooling units run almost continuously. The different components of the system thus may break down as a result of constant use. For example, blower motors within such units wear out or need replacement, and heating or cooling lines develop leaks.

Conventional climate control systems—particularly heating systems—for vehicles such as school buses have been located behind the dashboard and thus serviceable only from the interior of the passenger compartment. The dashboard and defrosting ducts typically have to be removed to gain access to the heating unit for repairs. The entire operation is complex and time consuming, requiring several hours to complete. The vehicle is effectively removed from fleet service for at least a day.

School and transit buses often have auxiliary heating units located underneath seats and near the side walls of the passenger compartment. These units may take in air through the exterior walls of the bus, but are still only serviceable from the interior of the bus.

The inaccessible climate control systems presently found in school buses do not permit easy repair and rapid turn-around. Therefore, what is needed is a climate control system for a school bus that does not require extensive disassembly for service or repair.

SUMMARY OF THE INVENTION

The present invention fulfills these needs in the art by providing a climate control system that is readily serviceable from outside the passenger compartment of a bus. In the present invention, a frame surrounds the components of a climate control unit, which may be either a heater or air conditioning unit. A climate control system having a heater is described in the preferred embodiment. The exterior wall may be situated on either the front, sides, or rear of the passenger compartment. The frame extends inwardly into the passenger compartment through an exterior wall of the compartment. The frame may be a simple structure—such as a rack—that holds and maintains the components of the climate control system in a proper relationship with each other. This embodiment of the frame is appropriate when the climate control system, when installed, is positioned between other components, such as a storage compartment or an audio system, such that neighboring components help direct the airflow through the climate control mechanism. In the absence of such neighboring components, the frame has walls and panels to perform this function.

In the preferred embodiment, the frame includes a casing that projects into the passenger compartment. The casing has a top wall, a floor, and three side walls. An air intake, through which fresh air is drawn from the exterior of the vehicle, is provided in one of the side walls or the floor. The location of the air intake depends on the location on the climate control system in the passenger compartment—i.e., whether the system is located at the front, side, or rear of the compartment. In the preferred embodiment, the air intake is located in the floor of the casing. Similarly, an outlet through one of the casing walls is provided for the air that is either heated or cooled by the climate control unit. The outlet leads to a ducting system within the passenger compartment that distributes the air exiting the climate control system into the passenger compartment. In a preferred embodiment of the present invention, a seal is formed between the outlet of the casing wall and the duct in order to minimize leakage of exiting air from the system.

The climate control unit is serviceable from outside the passenger compartment through the cavity defined by the floor, top, and sides of the frame. A removable cover plate seals the cavity to protect the unit from the elements. The removable cover plate may be hingedly attached to either the frame or casing. In the preferred embodiment, the cover plate is affixed by attachment means such as screws or bolts to flanges formed in the side walls of the casing.

Preferably, the heater assembly includes an air filtering means, a heat exchanging means, and an air circulating means. The heater assembly is accessible from the exterior of the passenger compartment when the exterior cover plate is removed.

The present invention also provides a bus comprising: a chassis; a body that includes a passenger compartment attached the chassis; an internal combustion engine mounted on the chassis and having a liquid cooling system in which the liquid coolant within the cooling system is heated by the engine; a circulating system that circulates the heated liquid coolant from the cooling system around the body to distribute heated coolant along a path; a heater for the passenger compartment mounted on the body and operably linked to receive the distributed coolant, wherein the heater includes a heat exchanger and a blower that are mounted in the body and are accessible from the exterior of the body for repair or replacement.

The present invention also provides a maintenance method for a heater installed within a body of a bus comprising the steps of: removing a cover plate from an exterior surface of the body and exposing the heater components; servicing components of the heater; and re-installing the cover plate on the exterior of the surface of the body.

BRIEF DESCRIPTION OF THE DRAWINGS

The invention will better be understood by a reading of the Detailed Description of the Preferred Embodiment along with a review of the drawings, in which.

DETAILED DESCRIPTION OF THE PREFERRED EMBODIMENTS

Figure 1:
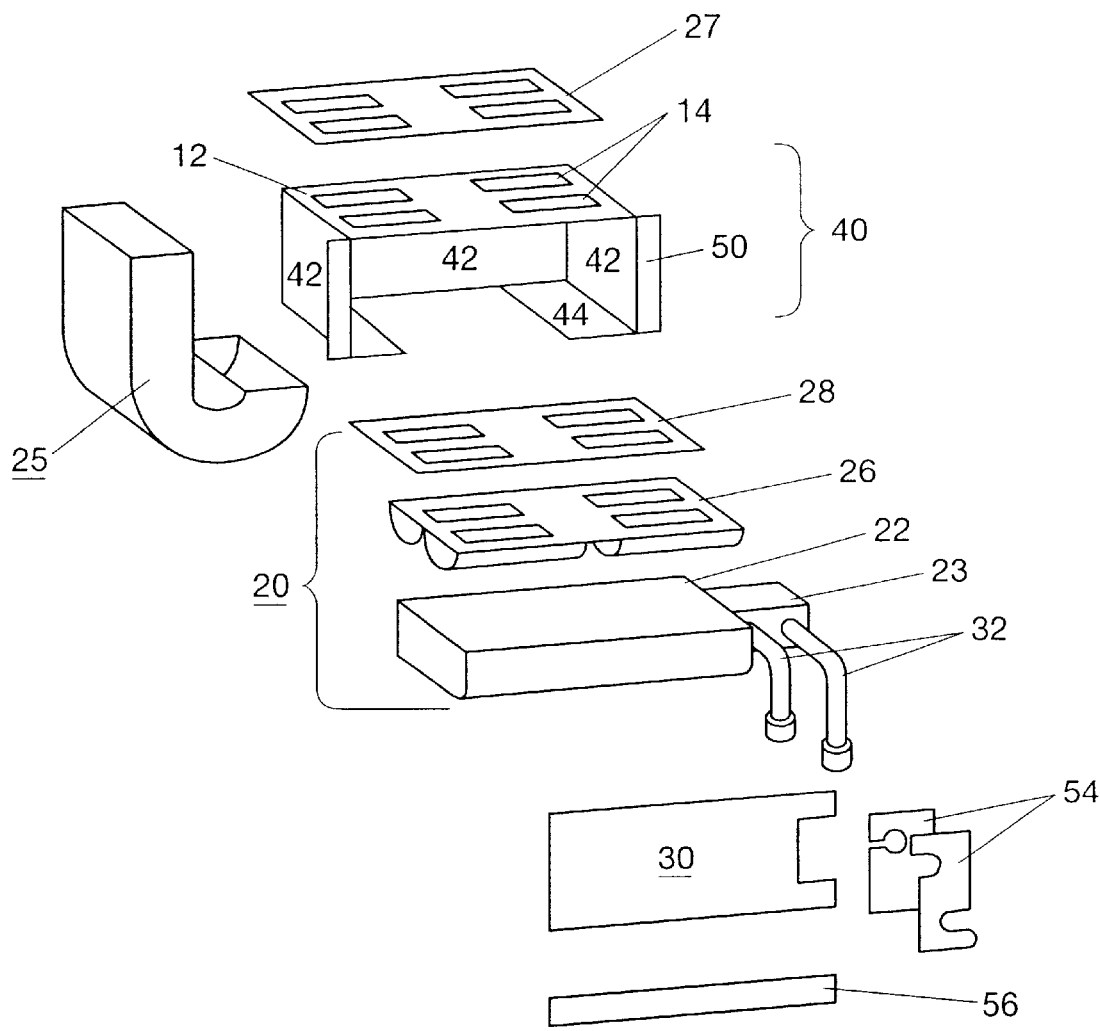
FIG. 1 is an exploded view of the climate control system according to a Preferred Embodiment of the present invention.

An exploded view of a climate control system 10 according to the present invention is shown in FIG. 1. A frame 12 holds the components of a heating unit 20 in relation to each other and in position within the vehicle. In the preferred embodiment, the frame 12 is a casing 40, having side walls 42, top wall 48, and floor 44. As can be seen in FIG. 1, the floor 44 may be minimal, consisting of ledges that project inwardly from the side walls 42. The top wall 48, floor 44, and side walls 42 are preferably constructed from sheet metal. Other materials, such as fiberglass or plastic, may be used to form the casing 40. An air intake 16 is located in the bottom floor 44 of the casing 40. Once heated, air is forced through outlets 14, located on the top wall 48 of the casing 40. The outlets 14 are in communication with air circulation ducts located within the interior of the passenger compartment of the bus (not shown). One or more of the ducts may direct heated air towards the inside of the windshield for defogging and defrosting.

The heater 20 of the preferred embodiment is of the type widely used in motor vehicles having a liquid cooled internal combustion engine. Such a cooling system includes a filter 24 positioned over air intake 16, a heater coil 22 connected to the cooling system of the vehicle's internal combustion engine (e.g., by lines 32 shown in FIG. 2B), and a blower assembly 26. The slidably removable filter 24, positioned between the air intake 16 and heater coil 22, prevents particulate matter from entering the climate control system 10. The heater coil 22 is connected in series with an electronic water valve 23. The electronic water valve 23 controls the flow of heated fluid to the heater coil 22 in response to manipulation of conventional electrical controls by the bus driver. The blower assembly 26 draws air from the exterior of the vehicle through the filter 24 and past the heater coil 22, and then forces air through outlet 14 into the ducting system (not shown) of passenger compartment of the vehicle. The climate control system 10 may also include a recirculation duct 25 which recirculates previously heated air from the passenger compartment through the heater 20. The heater 20 may further include a blower plate 28 which secures the blower motor assembly 26 to casing 40. A deformable gasket 29, preferably fabricated from a foamed plastic or rubber material may be installed between the blower plate 28 and the casing 40 to prevent leakage of air from the climate control system 10. A second deformable gasket 27 may be positioned on the exterior of the casing 40 to form a seal between the casing 40 and the ducting system.

The components of the heater 20 are secured within the casing 40 and are accessible through an opening defined by side walls 42, top wall 48, and bottom floor 44 of the casing 40. The opening may be covered by a removable case cover 30. The removable case cover 30 may also include a filter cover 36. The filter cover 36 provides access to the filter 24 for replacement. In the preferred embodiment, the removable case cover 30 and casing 40 are constructed from flat sheet formed from a metal, such as steel. Alternatively, the case cover 30 may be fabricated from other materials such as plastic or fiberglass. Flanges 50, formed on the side walls 42 of casing 40 provide a face to which the case cover 30 can be attached using means such as screws or bolts. Flanges 50 also serve as attachment point for climate control system 10 and casing 40 to a wall of the bus. In a preferred embodiment, the filter 24, heater coil 26, and blower plate 28 (with attached blowers 20) can be slidably positioned within the casing 40, supported by edges or flanges located on the inside of side walls 42 (not shown). The motors of the blowers 20 are provided with quick-disconnect connectors, and the heater coil 22 has make-and-break connections to lines 32.

Figure 2A:
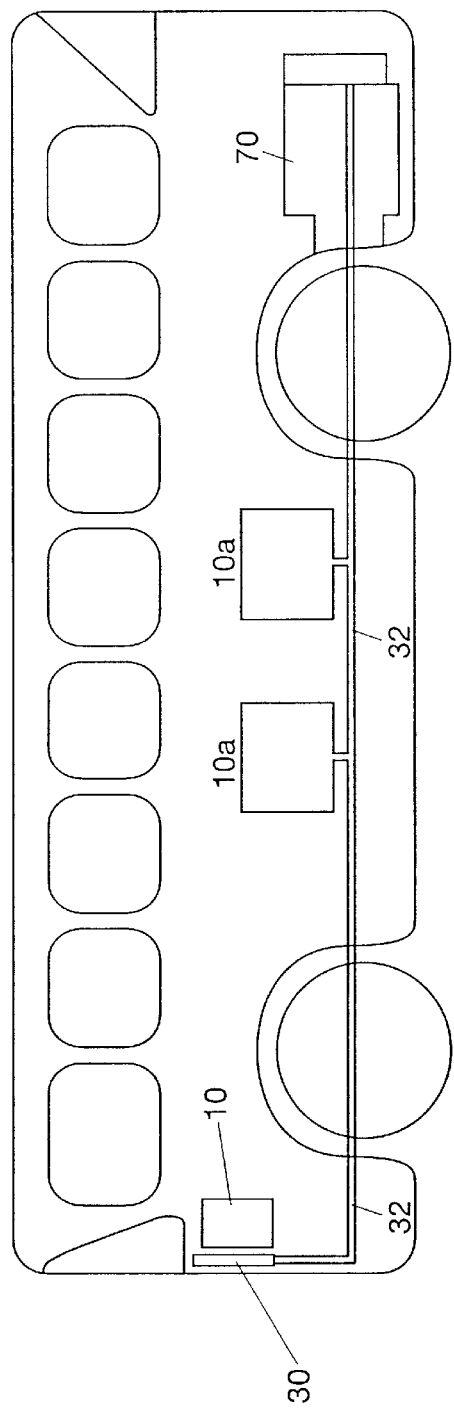
FIG. 2A is a side view of a school bus showing the location of the climate control system of the embodiment of FIG. 1.
Figure 3:
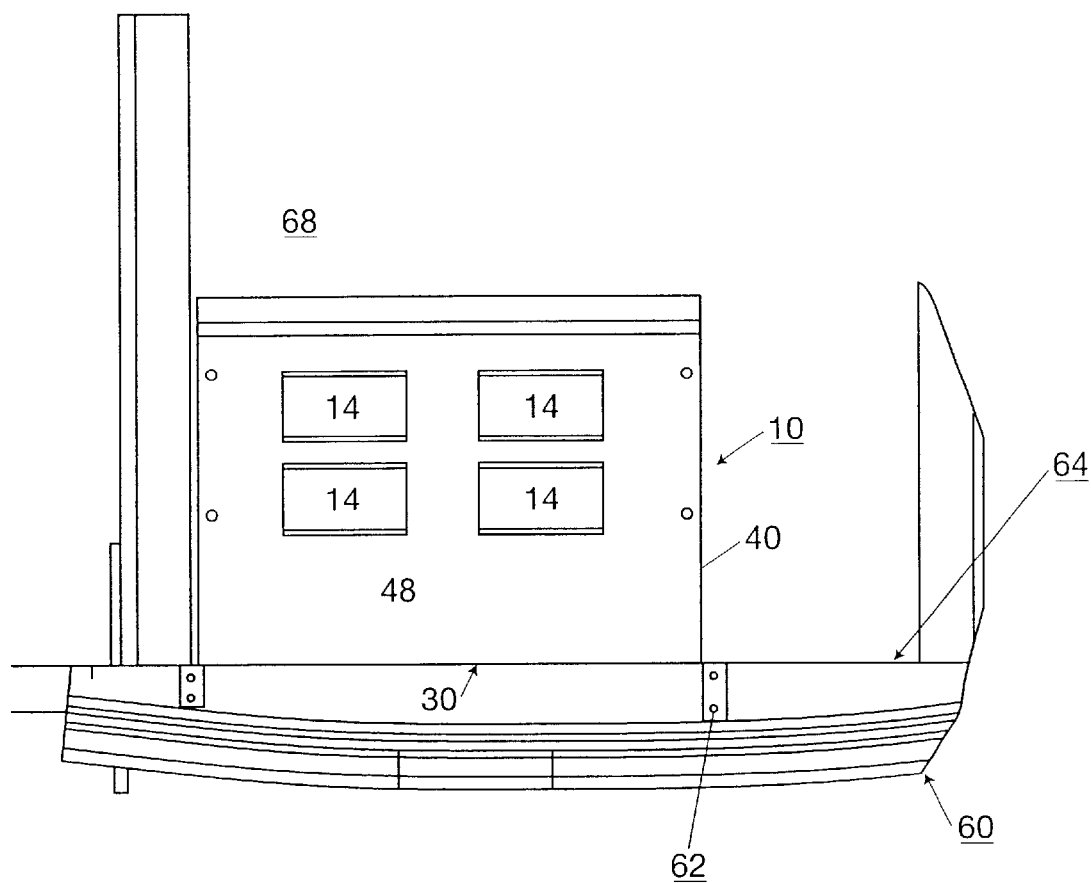
FIG. 3 is a top sectional view showing a climate control system according to the present invention located at the front of the school bus.

FIG. 3 is a top view of a climate control system 10 located at the front fire wall 64 of a type "D" school bus 60. The climate control system 10 and casing 40 extend beyond firewall 64 into the passenger compartment 68. The climate control system 10 is secured to the firewall 64 by mounting means, preferably screws, that pass through flanges 50 and into the firewall 64. Additional mounting screws 62 may be used to secure the climate control system 10 to the frame of the school bus 60. A type "D" school bus 60 is shown in profile in FIG. 2A. The location of the climate control system 10 of the present invention at the front of the bus is shown in the figure. The case cover 30 closes off the opening to the cavity within the casing 40. As shown in FIG. 2A, the removable case cover 30 faces outwardly toward the exterior of the school bus 60. An additional panel in the exterior wall of the bus 60 may be removed to provide access to the climate control system 10.

Figure 2B:
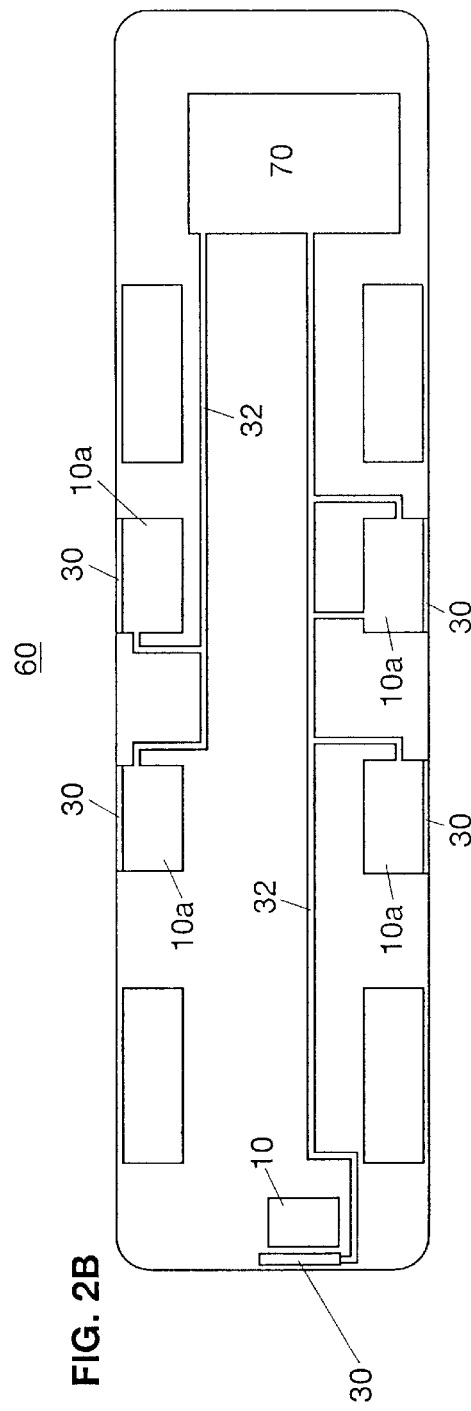
FIG. 2B is a schematic view of a school bus showing the climate control system of the present invention located adjacent to the front and side walls of the vehicle.

Additional units of the climate control system 10 of the present invention may be installed in the school bus such that they are accessible through the exterior side walls of the school bus, as shown in FIG. 2B. Side-mounted heating units 10A may be mounted to the exterior side walls of the school bus 60, using flanges 50 to attach to the walls. Heated fluid drawn from the cooling system of internal combustion system 70 is supplied to side mounted climate control systems 10A through lines 32. The lines 32 include a distribution line and a return line, with the side-mounted heating units 10A mounted in parallel across the lines 34. Other types of conventional interior-service heaters may be used, either connected in parallel or in series along lines 32.

Once the climate control system 10 has been installed within school bus 60, the components of the heater 20 may be accessed from the exterior of the school bus 60, rather than by disassembling the dashboard. To service the climate control system 10, an exterior panel of the school bus 60 is removed, as is the case cover 30 of the climate control system. This allows service personnel to access the components of the heater 20 from the exterior of the bus. As noted, the components of the heater 20 may be slidably mounted within the casing 40 of the climate control system 10, thereby facilitating easy removal and replacement of these components.

Alternatively, the entire frame or casing 40 can be completely removed from the exterior of the school bus 60 for service. Once the mounting means have been removed and the lines 32 have been disconnected from the heater coil 22, the entire casing and its contents may be slidably removed.

In addition to permitting speedy repairs, the invention provides a safety advantage over conventional climate control systems. Servicing the heater coil 22 conventional systems often results in some leakage or dripping of engine coolant. By permitting access to the heater from outside the passenger compartment, the present invention reduces the likelihood of potential spills.

Certain modifications and improvements will occur to those skilled in the art upon a reading of the foregoing description. For example, the removable case cover 30 may further include a coil plate 54 and coil gasket 52 to secure lines running from the heater coil 22 to the cooling system of the internal combustion engine 70 of the school bus 60. It should be understood that all such modifications and improvements have been deleted herein for the sake of conciseness and readability but are properly within the scope of the following claims.

I claim:

1. A climate control system for a coach vehicle such as a bus, comprising:
   a frame projecting inwardly from an outer wall of a passenger compartment of the coach vehicle, the frame having a top, a bottom, and three sides defining an interior cavity, the interior cavity having an air intake opening to an exterior of the coach vehicle and an air outlet opening to the passenger compartment;
   a removable exterior cover plate that is capable of closing the interior cavity and is attachable to the frame; and
   a climate control assembly disposed within said interior cavity, wherein the climate control assembly is accessible from the exterior of the passenger compartment when the exterior cover plate is removed.

2. The climate control system of claim 1 wherein the climate control assembly is a heater.

3. The climate control system of claim 2 wherein the heater includes a heat exchanger and an air circulating means.

4. The climate control system of claim 3 wherein the climate control assembly includes a filter.

5. The climate control system of claim 4 wherein the cover plate further includes a filter cover through which the filter is slidably removable.

6. The climate control system of claim 1 wherein the air intake is located in the bottom of the frame.

7. The climate control system of claim 1 wherein the air intake is located in one of the sides of the frame.

8. The climate control system of claim 1 wherein the air outlet is located in the top of the frame.

9. The climate control system of claim 8 wherein the air outlet is in direct communication with at least one air duct that is located inside the passenger compartment.

10. The climate control system of claim 1 wherein the frame projects inwardly from a front wall of the coach vehicle.

11. The climate control system of claim 1 wherein the coach vehicle has a substantially flat front wall and the frame projects inwardly from the front wall the passenger compartment of the coach vehicle.

12. The climate control system of claim 1 wherein the coach vehicle has a substantially flat side wall and the frame projects inwardly from the side wall the passenger compartment of the coach vehicle.

13. The climate control system of claim 1 wherein the frame further includes three side walls, a top wall, and a bottom wall.

14. The climate control system of claim 13 wherein the air intake is located in the bottom wall.

15. The climate control system of claim 13 wherein the air intake is located in one of the side walls.

16. The climate control system of claim 13 wherein the air outlet is located in the top wall.

17. The climate control system of claim 12 wherein the exterior cover plate, bottom wall, top wall, and side walls are sheet metal.

18. The climate control system of claim 17 wherein the sheet metal is steel.

19. The climate control system of claim 13 wherein the exterior cover plate, bottom wall, top wall, and side walls are fiberglass.

20. The climate control system of claim 13 wherein the exterior cover plate, bottom wall, top wall, and side walls are plastic.

21. A frame for containing a climate control system for a coach vehicle, comprising a casing adapted to be mounted to project inwardly from an outer wall of a passenger compartment of the coach vehicle, the casing having a top wall, a bottom wall, and three side walls defining an interior cavity, the interior cavity having an air intake and an air outlet, and a removable exterior cover plate that is capable of sealing the interior cavity and is attachable to the casing.

22. The frame of claim 21 further comprising an air intake located in the bottom wall.

23. The frame of claim 21 further comprising an air intake located in one of the side walls.

24. The frame of claim 21 further comprising an air outlet located in the top wall.

25. A climate control system for a coach vehicle, comprising:
   a frame for containing a climate control unit for a coach vehicle, including a casing projecting inwardly from an outer wall of a passenger compartment of the coach vehicle, wherein the casing has a top wall, a bottom wall, and three side walls defining an interior cavity, the interior cavity having an air intake opening to an exterior surface of the coach vehicle and an air outlet opening to the passenger compartment;
   a removable exterior cover plate that is capable of closing the interior cavity and is attachable to the casing; and
   a heater assembly disposed within said interior cavity, wherein the heater assembly includes an air filtering means, a heat exchanging means, and an air circulating means, and wherein the heater assembly is accessible from the exterior of the passenger compartment when the exterior cover plate is removed.

26. The climate control system of claim 25 wherein the air intake is located in the bottom of the casing.

27. The climate control system of claim 25 wherein the air outlet is located in the top of the casing.

28. The climate control system of claim 27 wherein the air outlet is in direct communication with at least one air duct located within the passenger compartment.

29. The climate control system of claim 27 further including a sealing means located between the top casing and the air duct, thereby preventing leakage of exiting air from the climate control system.

30. The climate control system of claim 29 wherein the sealing means is a gasket formed from deformable material.

31. The climate control system of claim 25 wherein the coach vehicle has a substantially flat front wall and the frame projects inwardly from the front wall the passenger compartment of the coach vehicle.

32. The climate control system of claim 25 wherein the coach vehicle has a substantially flat side wall and the frame projects inwardly from the side wall of the coach vehicle.

33. The climate control system of claim 25 further including a recirculating duct connected to the air intake, wherein heated air from the passenger compartment is drawn through the recirculating duct and returned to the heater.

* * * * *